DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 3, 1974

929 O.G. 10

T929,008

FAST-DRAINING NEOPRENE-ASBESTOS FIBER SLURRIES

Albertus van Cleeff, Wilmington, Del., assignor to E. I. du Pont de Nemours and Company, Wilmington, Del.

Filed Mar. 11, 1974, Ser. No. 449,722

Int. Cl. D21f *11/00*

U.S. Cl. 162—155

No Drawing. 7 Pages Specification

In the process of forming asbestos fiber sheets by depositing neoprene latex on chrysotile asbestos fibers in aqueous slurry, and draining water from the slurry through a screen, the rate of water drainage is increased by using a neoprene latex in which substantially all cations are potassium ions. The neoprene latex is prepared in the presence of potassium salts of anionic emulsifying agents and potassium salts such as potassium persulfate is preferred to sodium salts as components of the catalyst. Neoprene may be either a homopolymer of chloroprene or a copolymer of chloroprene with other copolymerizable monomers, the proportion of such other monomers not exceeding about 60 weight percent of the polymer.

Small amounts of sodium salts, up to about 0.05 part per 100 parts by weight of monomers can be tolerated by the system and do not have deleterious effects on the water drainage rate in the sheet-forming stage. Copolymerization monomers which may be incorporated in the chloroprene polymer have one or more double bonds, of which only one is terminal. They include, for example, styrene, vinyltoluenes, vinylnaphthalenes, methyl acrylate and methacrylate, acrylonitrile, 1,3-butadiene, isoprene, and 2,3-dichloro-1,3-butadiene.